United States Patent

Blumenfeld

[11] Patent Number: 4,655,812
[45] Date of Patent: Apr. 7, 1987

[54] ELECTRIC HEATING OF GLASS FOREHEARTH

[75] Inventor: John F. Blumenfeld, Simsbury, Conn.

[73] Assignee: Emhart Industries, Inc., Farmington, Conn.

[21] Appl. No.: 776,630

[22] Filed: Sep. 16, 1985

[51] Int. Cl.⁴ .............................................. C03B 5/235
[52] U.S. Cl. ...................................... 65/346; 65/136; 65/137; 65/162; 65/337; 65/347
[58] Field of Search ................. 65/346, 137, 136, 162, 65/337, 347

[56] References Cited

U.S. PATENT DOCUMENTS 1,953,023  3/1934  Mulholland .................. 65/137 X
3,531,275  9/1970  Magnusson et al. ............. 65/136 X

*Primary Examiner*—Arthur Kellogg
*Attorney, Agent, or Firm*—Breiner and Breiner

[57] ABSTRACT

A forehearth for a glass furnace includes a roof formed of a plurality of roof blocks designed to provide below the roof blocks a central longitudinal channel and side channels on each side of the central channel. An electric heating element is positioned in a bore in the roof blocks substantially directly above the side channels to permit radiation of heat to the glass surface above the side channels. The temperature of the molten glass utilizing the construction can be effectively uniformly controlled across its cross-section.

15 Claims, 8 Drawing Figures

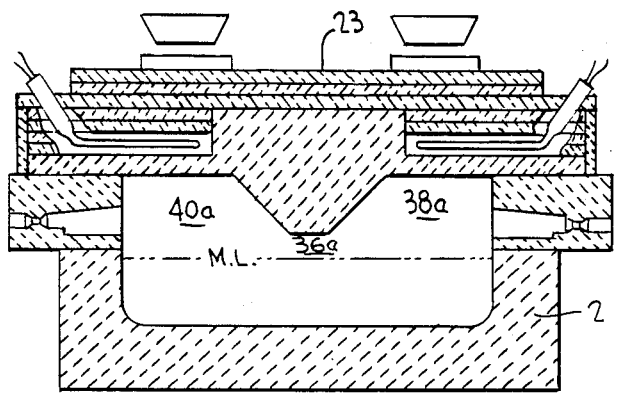
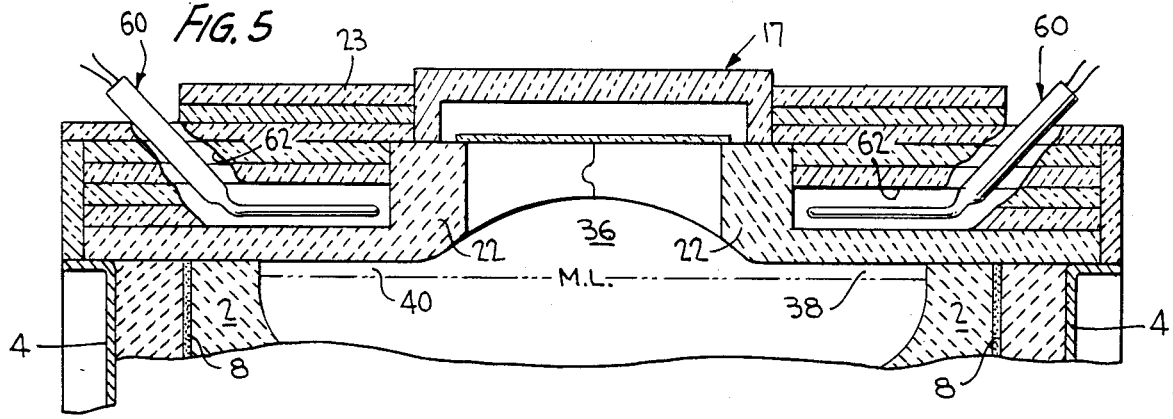
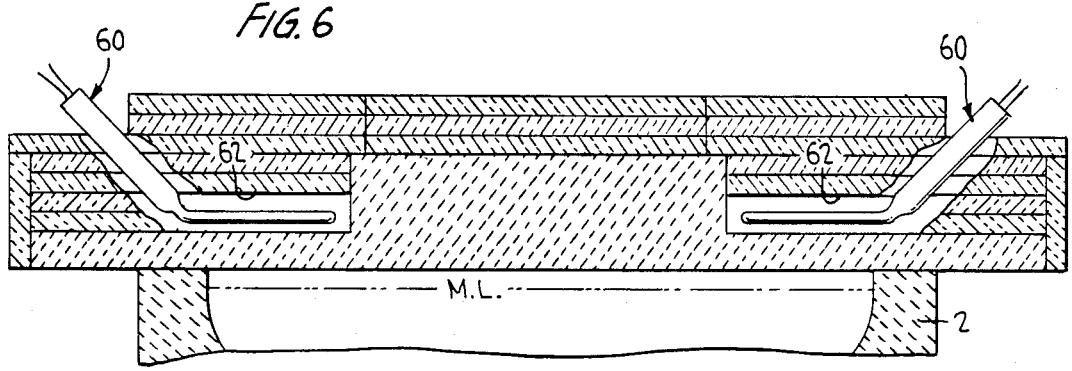
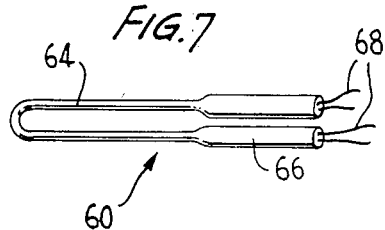
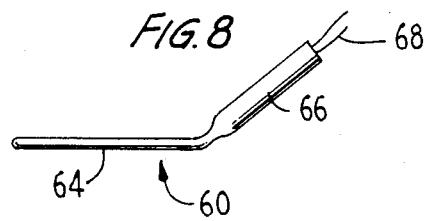

ELECTRIC HEATING OF GLASS FOREHEARTH

RELATED CASES

This invention relates to of U.S. application Ser. No. 559,160 filed Dec. 7, 1983, in the names of J. F. Blumenfeld and F. Bubon, assigned to the assignee of the present application.

FIELD OF INVENTION

This invention relates generally to a molten glass forehearth of the type used between a glass melting furnace and a feeder bowl; and more particularly relates to improved electric heating of the forehearth.

BACKGROUND OF INVENTION

In the production of glass articles such as bottles, molten glass is produced in a glass furnace, and then flows through a forehearth in a continuous molten glass stream to a feeder bowl from which the molten glass is fed in gobs into a glassware-forming section. A typical forehearth comprises a refractory trough for carrying the molten glass covered with an insulated roof.

It is recognized in the art of glassmaking that it is difficult to maintain the temperature of the glass homogeneous throughout its cross-section while being carried from the melting furnace to the feeder bowl. The glass tends to cool more rapidly at the outside edges of the glass stream due to the cooling effect of the sidewalls of the trough. For this reason, heating means such as gas burners, submersible electrodes, or the like have been provided in the sidewalls of the forehearth to heat the glass. Cooling air may also be blown into the forehearth either transversely or longitudinally of the direction of flow of the molten glass to help control the temperature of the glass stream. With the proper rates of heating and cooling, homogeneity of the glass temperature across the stream of glass can be improved.

Accordingly, glass forehearth structures have been proposed which include heaters positioned in the sidewalls of the forehearth structure to heat the glass stream along the longitudinal edges of the stream. One such structure is described in the aforesaid commonly assigned application Ser. No. 559,160, now U.S. Pat. No. 4,552,579, the disclosure thereof being incorporated herein by reference. The forehearth described in Ser. No. 559,160 comprises a trough having a roof thereover; a pair of spaced projections extending downwardly from the roof to define a central channel over the central portion of the stream of glass, and side channels over respective side portions of the stream of glass. The roof has a reduced thickness in the portion over the central channel. An enclosed cooling channel extends longitudinally of the forehearth over the areas of reduced thickness. The forehearth includes means at the sidewalls thereof for directing heat against the spaced projections extending downwardly from the roof. The heat is deflected from the projections to thereby heat the side portions of the glass stream.

In the embodiment of the forehearth shown in the drawing of the application; the heating is accomplished by combustion of gases in gas burners. However, it is stated that heating can be accomplished electrically by insertion of electrodes spaced at proper intervals along the length of the forehearth into the glass stream so that the current flow results in preferential heating of the glass along the edges longitudinally. With electrodes submerged in the glass, voltage is applied between electrodes, resulting in a flow of electric current through the glass and dissipation of energy by $I^2R$ loss in the glass. This method has a disadvantage in that it is difficult or impossible to control the path of the electric current so that energy cannot easily be added in the portion of the glass desired. Furthermore, the electric current flows preferentially through the hottest glass, which tends to exaggerate temperature non-uniformity in the glass, which is generally the opposite of what is desired. In addition, it has been found that electric heating by this method frequently results in creation of blisters in the glass as a result of localized overheating, electrochemical cell creation, or other origin. Further, the electrodes must be essentially permanently installed, so that they are inaccessible for easy removal or replacement in the event of breakage.

It has also been proposed to electrically heat the forehearth with silicon carbide elements installed beneath the forehearth roof. However, the heating cannot be concentrated at the forehearth side as with gas burners since the elements must span the forehearth roof. Forced cooling is also difficult or impossible to arrange. Silicon carbide has also been found to be an undesirable material in the presence of glass since it gradually deteriorates and particles can fall into the glass, causing defects in the glass articles to be formed.

PRIMARY OBJECTS AND GENERAL DESCRIPTION OF THE INVENTION

It is a primary object of the present invention to provide improved means for the electric heating of a glass forehearth, and to obviate the disadvantages associated with submerged electrodes or heating elements installed beneath the forehearth roof.

It is another primary object of the present invention to provide an electrically heated glass forehearth wherein the glass stream within the refractory trough is maintained at substantially uniform temperature across its cross-section.

These and other objects of the invention will be apparent from the following general description, and the detailed description with reference to the drawings.

According to the present invention, an electrically heated glass forehearth is provided which permits control of the glass temperature throughout the molten glass stream. Specifically, according to the invention electric heating elements are installed on, or in, the roof blocks of the forehearth. These elements are preferably of Kanthal Super (molybdenum disilicide) construction, but may alternately be made of silicon carbide (Glo-bars or hot-rods) or other high-temperature material. These elements operate at a very high surface temperature, e.g., about 3000° F. for Kanthal Super, so that a substantial thermal driving force will exist for conduction of heat downward through the roof block, with subsequent radiation to the glass which is typically at temperatures of about 2000°–2400° F. Preferably, the elements are installed in troughs in the roof block or in chambers so that the roof block is only about 1½ to 3 inches thick at the area between the heater and rhe channel above the glass stream. The normal roof block thickness is typically about six inches. The roof block is covered with sufficient thermal insulation to prevent the loss of significant energy and to force essentially all the electrical energy to be directed downward into the forehearth. An energy density of approximately 10 KW per square foot of roof is readily attainable, which is more than sufficient for practical operation.

Gas burner blocks and the conventionally used combustion system may be left in place in the forehearth to be used for start-up, or for use alternately, or in combination with electricity. However, it is also possible to utilize a construction which omits the burner blocks. Initial heat-up of the forehearth in such case can be accomplished by temporary insertion of gas burners at the end or ends of the forehearth, then removing them for operation of the forehearth with electric heat.

BRIEF DESCRIPTION OF DRAWING IN RELATION TO PRESENTLY PREFERRED EMBODIMENT

FIG. 4 is a sectional view through the equalizing zone taken along line 4-4 of FIG. 1;

FIG. 5 is a sectional view through a cooling zone of a modified embodiment of the forehearth of the present invention;

FIG. 6 is a sectional view through the equalizing zone of the modified embodiment of the forehearth of the present invention;

FIG. 7 is a top view of the electric heater elements of the present invention; and FIG. 8 is a side view of the heater elements of the present invention.

DETAILED DESCRIPTION

Figure 1:
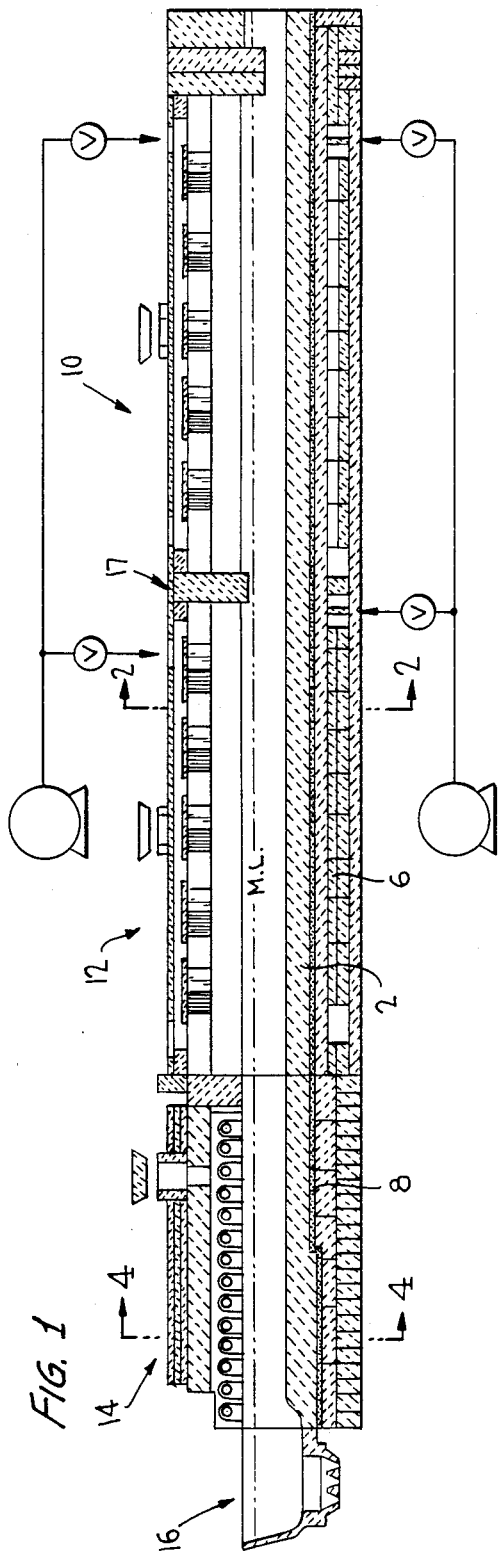
FIG. 1 is a schematic longitudinal axial section through a forehearth according to the present invention.

Referring to FIGS. 1 through 4 of the drawing, a forehearth constructed according to the present invention includes a generally U-shaped trough 2 of refractory material mounted in a metalic support structure 4 with insulating bricks 6 positioned between the trough 2 and support structure 4. A layer 8 of aluminum oxide powder is positioned between the trough 2 and insulating bricks 6 to enable the trough to be leveled.

As shown in FIG. 1, the forehearth includes cooling zones 10 and 12, each of which is substantially identical. As apparent, however, the number of such cooling zones can vary. An equalizing zone 14 is provided at the forward end of the cooling zone 12 to which a feeder bowl 16 is attached. The opposite end of the forehearth is mated to a glass distributor, not shown, as is conventional. The molten glass flows in the trough 2 at a level as indicated by the line labeled M.L. (metal line).

Figure 2:
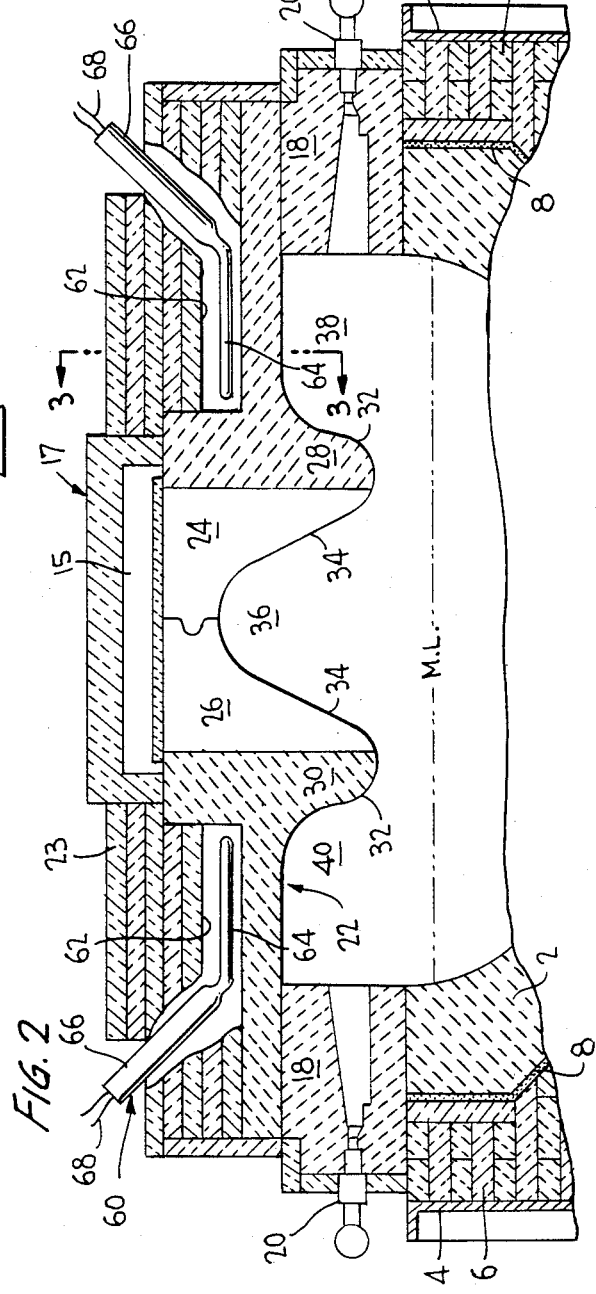
FIG. 2 is a sectional view through a cooling zone taken along line 2-2 of FIG. 1.

Referring primarily to FIGS. 1 and 2, a roof portion 17 of each cooling zone 10 and 12 includes opposed sides formed by burner blocks 18 in which are mounted burners 20 for heating the glass. As is conventional, these burners 20 are spaced along the length of the cooling zones 10 and 12 on both sides of the forehearth. According to the embodiment shown in FIGS. 1, 2 and 3, the roof portion 17 also includes a plurality of roof blocks 22 laid side by side along the length of the cooling zones 10 and 12 on top of the burner blocks 18 and secured in place by the support structure. Each roof block 22 is formed in two pieces 24 and 26 which have a plane of separation generally in the vertical median plane of the trough 2. The roof blocks 22 have to spaced projections 28 and 30 which extend downwardly toward the glass below the centerline of the burners and longitudinally of the forehearth. Each projection 28 and 30 has a generally arcuately inclined face 32 which faces the burner blocks 18 and an arcuately inclined face 34. Faces 34, 34 of projections 28, 30 face each other. This construction results in longitudinally extending channels in the underside of tne roof structure comprising a relatively deep central channel 36 over the central portion of the stream of molten glass and side channels 38 and 40 which are not as deep as the central channel on respective sides of central channel 36 over respective side portions of the stream of glass. A cooling passage 15 is formed above the roof line over central channel 36.

Referring to FIG. 4, the equalizing section of the forehearth has a modified roof line with respect to the roof line of the cooling section. In the equalizing section the central channel 36a has a lower depth than side channels 40a and 38a. Additionally, there is no cooling passage above the central channel as in the cooling section.

Figure 3:
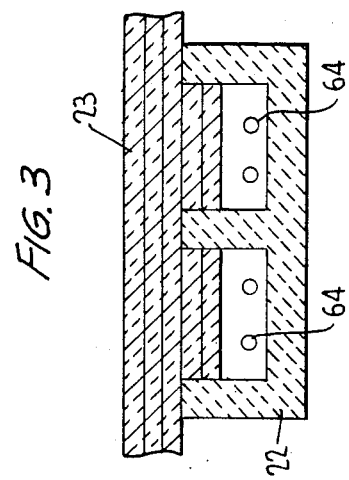
FIG. 3 is a sectional view taken along line 3-3 of FIG. 2.

As best shown in FIGS. 2, 3 and 4, roof block 22 also includes heater elements 60 positioned in bore 62. The heater elements as shown in FIGS. 7 and 8 include a heater portion 64 and a lead wire portion 66 connected to lead wires 68. The heating element practical operation must be capable of providing a greater than the surface temperature of the molten glass which is typically at about 2000° F. to 2400° F. If the element does not generate a temperature above the temperature of the glass, the downward radiation of heat energy to the glass is not adequate to provide the necessary heating of the glass. Elements which are particularly preferred are of the Kanthal Super (molybdenum disilicide) construction elements will generate a surface temperature of above about 3000° F. Other heating elements which can be utilized made of silicon carbide such as Glo-bars or hot-rods, or other high-temperature construction.

As shown in FIGS. 2, 3 and 4, heating element 60 contained in bore 62 of block 22 is approximately 1½ to 3 inches above the bottom surface of the roof block and, accordingly, will transmit heat downward into the side channels 38 and 40, directly below the block. This, in turn, will impart heat to the surface of the molten glass flowing in trough 2 and along the longitudinal edges of the molten glass stream where it meets the trough sidewalls. The top of the block is provided with insulation 23 so as to prevent any significant heat flow in an upward direction.

The forehearth construction as shown in FIGS. 1, 2, and 3 preferably utilizes the gas burners 20 for start-up of the forehearth. Once the forehearth is operating, it is normally preferable to close down the gas burners and rely on the electric heat only for controlling the temperature of the molten glass in the forehearth. It will be apparent, however, that the gas burners and the electric heaters can be used in combination.

FIGS. 5 and 6 illustrate the cooling section and equalizing section, respectively, of a modified forehearth construction. In the construction of FIGS. 5 and 6, the burner blocks 18 and burners 20 are eliminated. As a result, the roof block sits substantially closer to the metal line than it does when the burner block is utilized. Further, as is apparent, the roof block 22 in the cooling section is modified to the extent that it does not include projections 28 and 30 as in the roof block of FIG. 2. However, the roof blocks do have shoulder areas whereby, as in FIG. 2, there are effectively three channels below the roof block, center channel 36, and side channels 38 and 40. As also apparent, the roof block in the equalizing section is modified to the extent that the space above the glass stream is of the same depth across the entire glass stream.

In this alternate embodiment, the heater element 60 is positioned in bore 62 in roof block 22 and, as seen, is just above the surface of the molten glass. In this way the heat can be effectively transferred from the heater element through the block to the point where the heat is most needed.

As will be apparent, the electric heater elements disclosed in the present invention, although capable of use in any forehearth construction, are particularly adaptable to the forehearth construction as disclosed in Ser. No. 559,160. The forehearth disclosed in the aforesaid application, in that it includes means for separately cooling and heating a plurality of cooling zones, with the top and bottom cooling channels being independently controlled and with heating of the side portions of the stream of glass also being separately controlled, renders the electric heating elements particularly effective for temperature control. It is to be understood, therefore, that the present invention is preferably utilized with a forehearth construction as defined in the aforesaid application.

As will be apparent to one skilled in the art, various modifications can be made within the scope of the aforesaid description. Such modifications being within the ability of one skilled in the art form a part of the present invention and are embraced by the appended claims.

It is claimed:

1. A forehearth for the conveyance of molten glass having at least one cooling zone, said cooling zone including a trough for carrying a stream of molten glass and a roof over said trough, said roof defining in the space below said roof a central channel over the central portion of said stream of molten glass and side channel over respective side portions of said stream of glass, said central and side channels having different spacings between the glass line and roof, and said roof having in the area over each of said side channels electric heating elements, said elements being capable of generating sufficient heat to cause radiation of heat to said molten glass in the area below said elements.

2. The forehearth of claim 1 wherein said roof includes a plurality of roof blocks laid side by side over said trough and burner blocks between said trough and roof blocks, each of said roof blocks having projections extending downwardly from said roof blocks, said projections defining said central channel and the areas adjacent said projections defining said side channels.

3. The forehearth of claim 2 wherein said burner blocks contain heating means therein.

4. The forehearth of claim 1 wherein said forehearth includes insulation above said roof.

5. The forehearth of claim 2 wherein said roof blocks are formed in two pieces.

6. The forehearth of claim 2 wherein said roof blocks are unitary structures.

7. The forehearth of claim 1 wherein said electric heating elements over each of said side channels are independently controlled.

8. The forehearth of claim 1 wherein said roof blocks are positioned directly on said trough and said roof has a thinner roof thickness in the center thereof to form said central channel.

9. The forehearth of claim 1 wherein said heating element is constructed of molybdenum disilicide.

10. The forehearth of claim 1 wherein said heating element will operate at a surface temperature of above about 2500° F.

11. A forehearth for the conveyance of molten glass having at least one equalizing zone, said equalizing zone including a trough for carrying a stream of molten glass and a roof over said trough, said roof defining in the space below said roof a central channel over the central portion of said stream of molten glass and side channels over the respective side portions of said stream of molten glass, said central and side channels having different spacings between the glass line and roof, and said roof having in the area over each of said side channels electric heating elements, said elements being capable of generating sufficient heat to cause radiation of heat to said molten glass in the area below said elements.

12. The forehearth of claim 11 wherein said side channels have a greater spacing between the glass line and roof than the spacing between the glass line and roof of said central channel.

13. The forehearth of claim 11 wherein said central channel and side channels have equal spacing between the glass line and roof.

14. The forehearth of claim 12 wherein said roof includes a plurality of roof blocks laid side by side over said trough, and burner blocks between said trough and roof blocks, said burner blocks containing heating means.

15. A forehearth for the conveyance of molten glass including a trough for carrying a stream of molten glass and a roof over said trough, said roof defining in the space below said roof a central channel over the central portion of said stream of molten glass and side channels over the respective side portions of said stream of molten glass, said central and side channels having different spacings between the glass line and roof, and said roof having in the area over each of said side channels electric heating elements, said elements being capable of generating sufficient heat to cause radiation of heat to said molten glass in the area below said elements.

* * * * *